United States Patent
Kung et al.

(10) Patent No.: US 10,262,270 B2
(45) Date of Patent: Apr. 16, 2019

(54) SYSTEM AND METHOD FOR PREDICTING REMAINING USEFUL LIFE OF COMPONENT OF EQUIPMENT

(71) Applicant: INDUSTRIAL TECHNOLOGY RESEARCH INSTITUTE, Hsinchu (TW)

(72) Inventors: Hsiang-Tsung Kung, New Taipei (TW); Jia-Min Ren, Hsinchu (TW); Chuang-Hua Chueh, Taipei (TW); Sen-Chia Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 126 days.

(21) Appl. No.: 15/239,106

(22) Filed: Aug. 17, 2016

(65) Prior Publication Data

US 2017/0161622 A1 Jun. 8, 2017

(30) Foreign Application Priority Data

Dec. 7, 2015 (TW) .............................. 104140980 A

(51) Int. Cl.
 G06N 5/04 (2006.01)
 G06N 7/00 (2006.01)
 (Continued)

(52) U.S. Cl.
 CPC ........... *G06N 5/04* (2013.01); *G05B 23/0283* (2013.01); *G06N 7/005* (2013.01); *G06N 20/00* (2019.01)

(58) Field of Classification Search
 None
 See application file for complete search history.

(56) References Cited

U.S. PATENT DOCUMENTS 8,660,980 B2 2/2014 Herzog
8,849,586 B1 9/2014 Garvey
(Continued)

FOREIGN PATENT DOCUMENTS

CN 1867932 A 11/2006
CN 101872435 A 10/2010
(Continued)

OTHER PUBLICATIONS

Taiwanese Office Action dated Sep. 21, 2016.
(Continued)

*Primary Examiner* — David M. Gray
*Assistant Examiner* — Geoffrey T Evans
(74) *Attorney, Agent, or Firm* — Rabin & Berdo, P.C.

(57) ABSTRACT

A system and a method for predicting a remaining useful life (RUL) of a component of an equipment are provided. The system for predicting the RUL of the component of the equipment includes a data acquisition unit, a feature capturing unit, a mapping function generating unit, a similarity analyzing unit and a RUL calculating unit. The feature capturing unit obtains an estimation feature according to a real time sensing record, and obtains a plurality of training features according to a set of history sensing records. The similarity analyzing unit obtains k similar features which are similar to the estimation feature according to the training features. The RUL calculating unit obtains at least one of k predicting information via a mapping function according to the k similar features and calculates an estimation RUL according to at least one predicting value.

21 Claims, 7 Drawing Sheets

(51) Int. Cl.
*G05B 23/02* (2006.01)
*G06N 20/00* (2019.01)

(56) References Cited

U.S. PATENT DOCUMENTS

| | | | |
|---|---|---|---|
| 9,002,775 | B1 | 4/2015 | Harrison et al. |
| 2003/0009311 | A1 | 1/2003 | Ushiku et al. |
| 2003/0014226 | A1* | 1/2003 | Loecher .................. G06Q 10/06 703/2 |
| 2004/0059694 | A1* | 3/2004 | Darken .................. G06Q 10/06 706/21 |
| 2004/0242122 | A1 | 12/2004 | Kramer et al. |
| 2006/0164602 | A1 | 7/2006 | Jayaram et al. |
| 2007/0250229 | A1 | 10/2007 | Wu |
| 2013/0151308 | A1 | 6/2013 | Helms et al. |
| 2015/0262060 | A1* | 9/2015 | Husain .................. G06N 3/08 706/21 |
| 2016/0217379 | A1* | 7/2016 | Patri .................. G06N 99/005 |
| 2017/0146432 | A1* | 5/2017 | Hsieh .................. G01M 99/005 |
| 2017/0276720 | A1* | 9/2017 | Hsu .................. G01R 31/2601 |
| 2018/0165592 | A1* | 6/2018 | Huang .................. G05B 23/0283 |

FOREIGN PATENT DOCUMENTS

| | | |
|---|---|---|
| CN | 104102804 A | 10/2014 |
| CN | 104713728 A | 6/2015 |
| CN | 104899608 A | 9/2015 |
| TW | I234610 B | 6/2005 |
| TW | 200911010 A | 3/2009 |
| TW | 200951752 A | 12/2009 |
| TW | I463334 B | 12/2014 |

OTHER PUBLICATIONS

Bhaskar Saha et al., "Comparison of Prognostic Algorithms for Estimating Remaining Useful Life of Batteries", Transactions of the Institute of Measurement and Control 31(3), Jun. 2009.

Zhigang Tian, "An artificial neural network method for remaining useful life prediction of equipment subject to condition monitoring", J Intell Manuf (2012) 23, pp. 227-237.

J. Wesley Hines et al., "Nonparametric Model-Based Prognostics", Reliability and Maintainability Symposium, 2008 (RAMS 2008), Jan. 28-31, 2008, pp. 469-474.

J. Lee et al., Development of a Predictive and Preventive Maintenance Demonstration System for a Semiconductor Etching Tool, ECS Transactions, 52 (1), pp. 913-927, 2013.

Tianyi Wang et al., "A similarity-based prognostics approach for Remaining Useful Life estimation of engineered systems", 2008 International Conference on Prognostics and Health Management, Oct. 6-9, 2008, pp. 1-6.

Michal Aharon et al., "K-SVD: An Algorithm for Designing Overcomplete Dictionaries for Sparse Representation", IEEE Transactions on Signal Processing, vol. 54, No. 11, Nov. 2006, pp. 4311-4322.

Julien Mairal et al., "Online dictionary learning for sparse coding", ICML '09, Proceedings of the 26th Annual International Conference on Machine Learning, pp. 689-696.

Scott Shaobing Chen et al., "Atomic Decomposition by Basis Pursuit", SIAM J. Sci. Comput., vol. 20, No. 1, pp. 33-61, Aug. 5, 1998.

Joel A. Tropp et al., "Signal Recovery From Random Measurements Via Orthogonal Matching Pursuit", IEEE Transactions on Information Theory, vol. 53, No. 12, Dec. 2007, pp. 4655-4666.

Robert Tibshirani, "Regression Shrinkage and Selection Via the Lasso", Journal of the Royal Statistical Society, Series B (Methodological), vol. 58, No. 1. (1996), pp. 267-288.

Feng Xue et al., "An Instance-Based Method for Remaining Useful Life Estimation for Aircraft Engines", J Fail. Anal. and Preven. Apr. 2008, vol. 8, No. 2, pp. 199-206.

* cited by examiner

US 10,262,270 B2

SYSTEM AND METHOD FOR PREDICTING REMAINING USEFUL LIFE OF COMPONENT OF EQUIPMENT

This application claims the benefit of Taiwan application Serial No. 104140980, filed Dec. 7, 2015, the disclosure of which is incorporated by reference herein in its entirety.

TECHNICAL FIELD

The disclosure relates in general to a predicting system and a predicting method, and more particularly to a system and a method for predicting a remaining useful life (RUL) of a component of an equipment.

BACKGROUND

Manufacturing is one of the top 5 big data markets, in which the market share of manufacturing is about 10%. According to one reach, the failure of the important equipment is the main factor that influences the operation of the company. If one can analyze the failure of the important equipment, the operation efficiency can be improved and the competitiveness of enterprises can be greatly increased.

Prognostics and health management can be used to monitor and evaluate the state of the equipment (or its component). The time to maintain or replace a component can be decided by the state of the equipment (or its component) in order to reduce unscheduled downtime. More specifically, if the remaining useful life of the component can be accurately predicted, the component can be maintained or replaced in advance. However, the amount of data of some of the components may not be enough and the variability of the failure of the components is high, such that the predicting model is difficult to be obtained. Therefore, accurately predicting the remaining useful life according to little data is an important issue nowadays.

SUMMARY

The disclosure is directed to a system and a method for predicting a remaining useful life (RUL) of a component of an equipment.

According to one embodiment, a system for predicting a remaining useful life (RUL) of a component of an equipment is provided. The system includes a data acquisition (DAQ) unit, a feature capturing unit, a mapping function generating unit, a similarity analyzing unit and a RUL calculating unit. The DAQ unit is for obtaining a real time sensing record. The feature capturing unit is for obtaining an estimation feature according to the real time sensing record, and obtaining a plurality of training features according to a plurality of history sensing records. The mapping function generating unit is for obtaining a mapping function according to the training features. The mapping function includes a relationship between the training features and at least one predicting value. The similarity analyzing unit is for obtaining k similar features which are similar to the estimation feature according to the training features. The RUL calculating unit is for obtaining the at least one predicting value via the mapping function according to the k similar features and calculating an estimation RUL according to the at least one predicting value.

According to another embodiment, a method for predicting a remaining useful life (RUL) of a component of equipment is provided. The method includes the following steps. A real time sensing record is obtained. An estimation feature is obtained according to the real time sensing record, and a plurality of training features are obtained according to a plurality of history sensing records. A mapping function is obtained according to the training features. The mapping function includes a relationship between the training features and at least one predicting value. k similar features which are similar to the estimation feature are obtained according to the training features. The at least one predicting value is obtained via the mapping function according to the k similar features and an estimation RUL is calculated according to the at least one predicting value.

Figure 1:
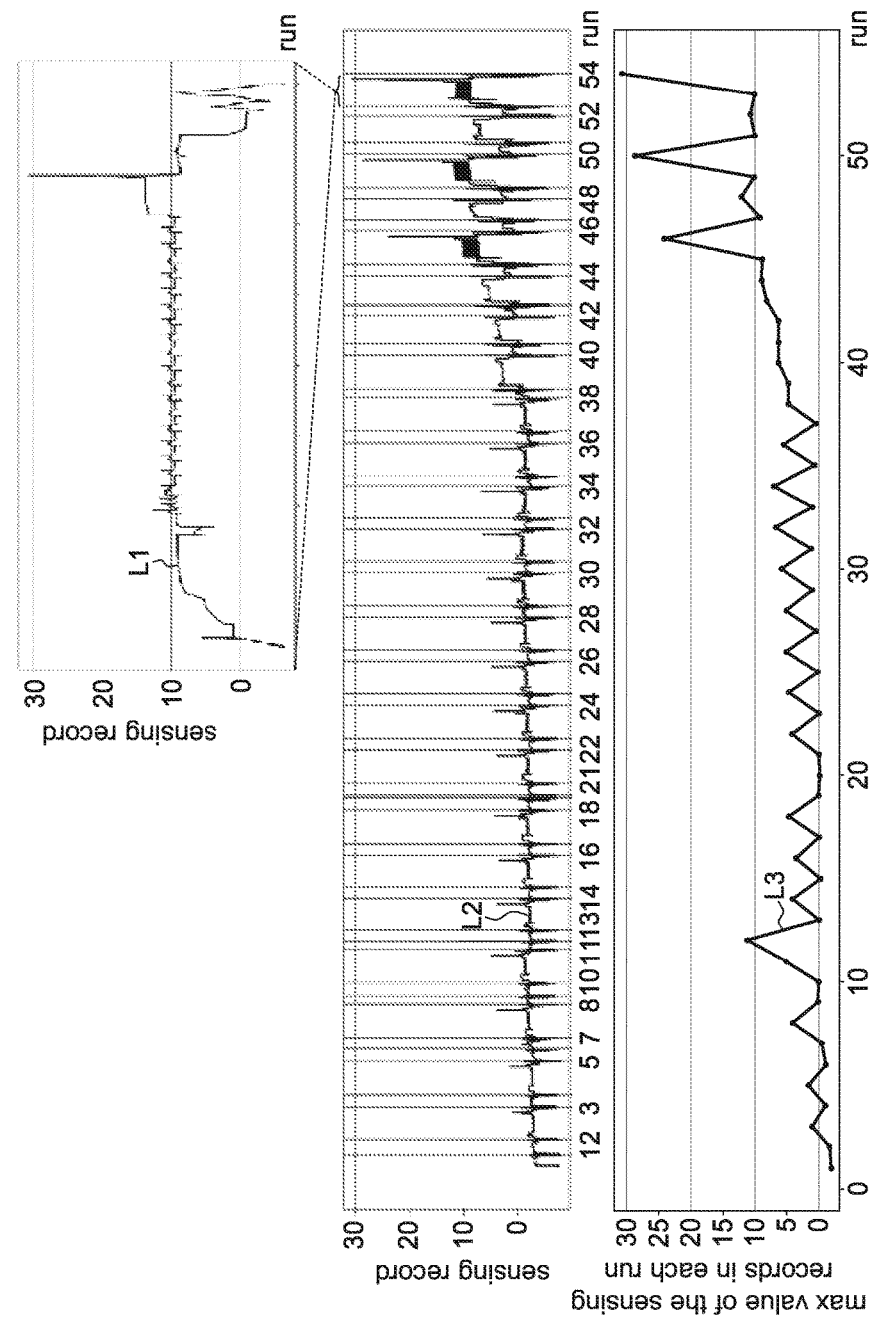
FIG. 1 shows a sensing curve of a metal organic chemical-vapor deposition (MOCVD) equipment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the present invention, a remaining useful life prediction (RUL prediction) can be performed on a component of an equipment, such as a particle filter of a semiconductor equipment or an LED manufacturing equipment. Please refer to FIG. 1, which shows a sensing curve of a metal organic chemical-vapor deposition (MOCVD) equipment. In the MOCVD equipment, a curve L1 presents sensing records, i.e. filter values. If the max value of the sensing records is larger than 30, the particle filter is needed to be replaced. The curve L2 presents sensing records in one cycle from the beginning of particle filter to the end of the particle filter. The curve L3 presents the max value of the sensing records in each run.

The RUL prediction of the particle filter of the MOCVD is for predicting a time when the max value of the sensor records will be larger than 30. The following embodiment is illustrated by the curve L3.

Figure 2:
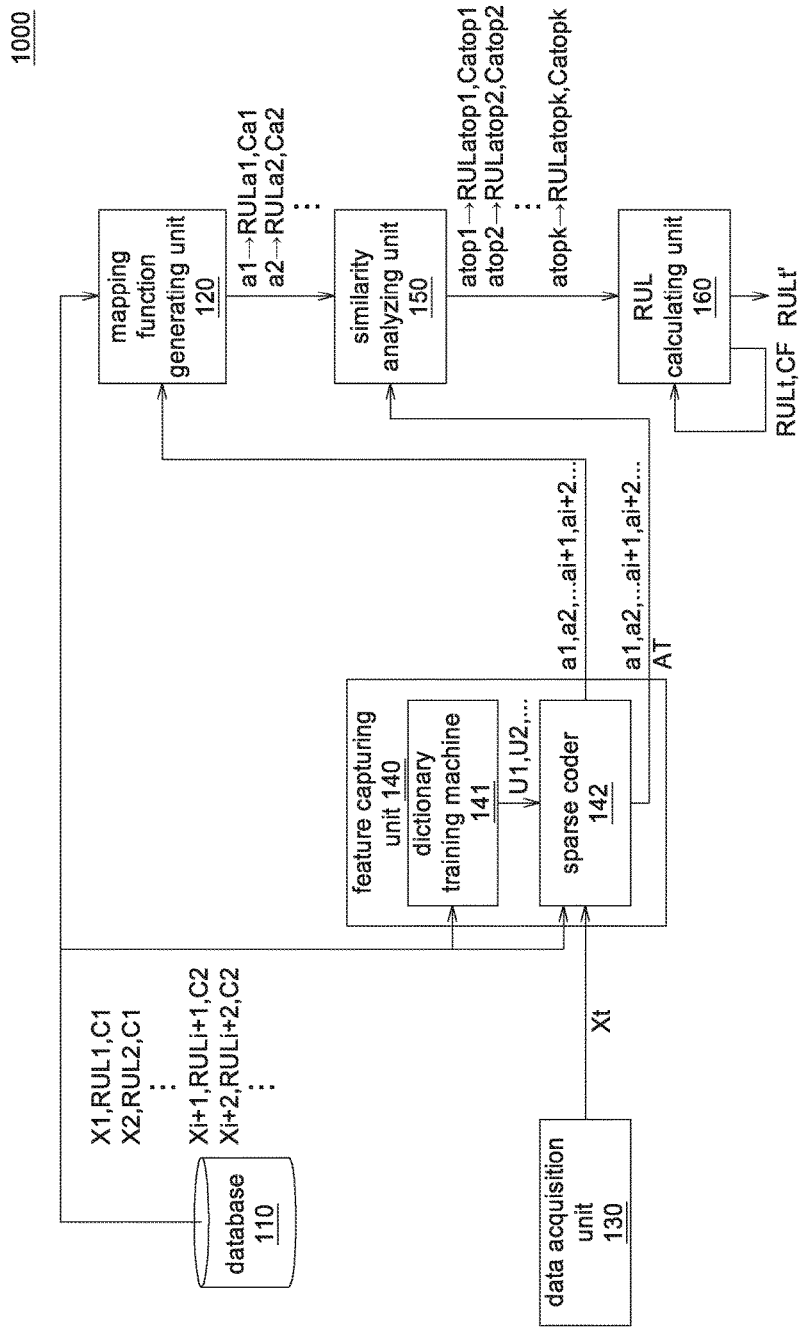
FIG. 2 shows a system for predicting a RUL of a component of an equipment.
Figure 3:
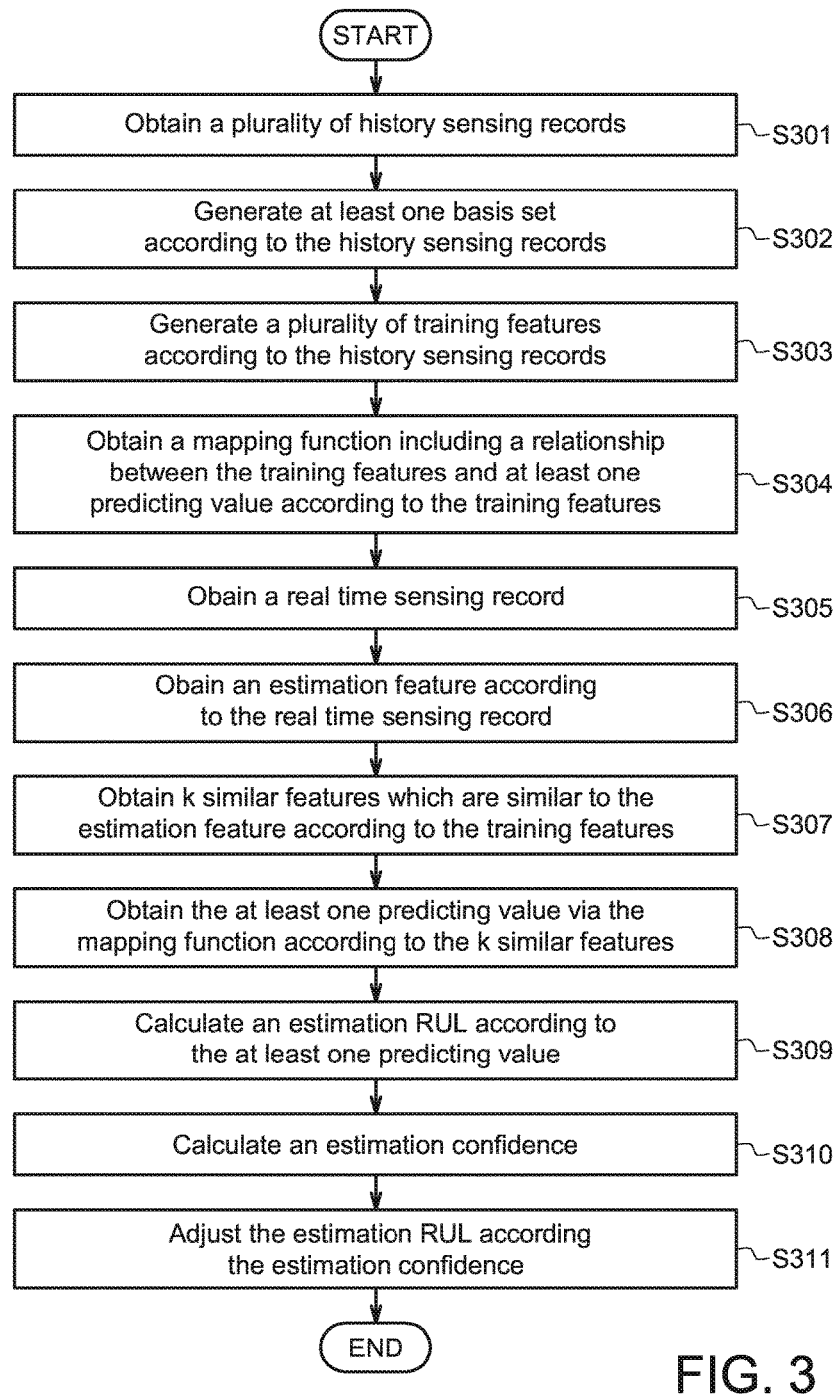
FIG. 3 shows a flowchart of a method for predicting the RUL of the component of the equipment.

Please refer to FIG. 2 which shows a system 100 for predicting the RUL of the component of the equipment, and FIG. 3 which shows a flowchart of a method for predicting the RUL of the component of the equipment. The system for predicting the RUL of the component of the equipment includes a database 110, a mapping function generating unit 120, a data acquisition unit (DAQ unit) 130, a feature capturing unit 140, a similarity analyzing unit 150 and a RUL calculating unit 160. The database 110 for storing varied kinds of data can be a hard disk, a memory, a portable storage device or a storage could center. The mapping function generating unit 120 is for generating a function according to some data. The DAQ unit 130 is for capturing some data. The feature capturing unit 140 is for capturing feature according to some data. The feature capturing unit 140 includes a dictionary training machine 141 and a sparse coder 142. The similarity analyzing unit 150 is for performing a similarity comparison algorithm. The RUL calculating unit 160 is for performing some calculating procedure. Each of the mapping function generating unit 120, the feature capturing unit 140, the similarity analyzing unit 150 and the RUL calculating unit 160 can be a circuit, a package chip, a circuit board or a storage device storing a plurality of codes. The DAQ unit 130 can be a sensor, a transmitting line or a wireless transmitting device.

Figure 4:
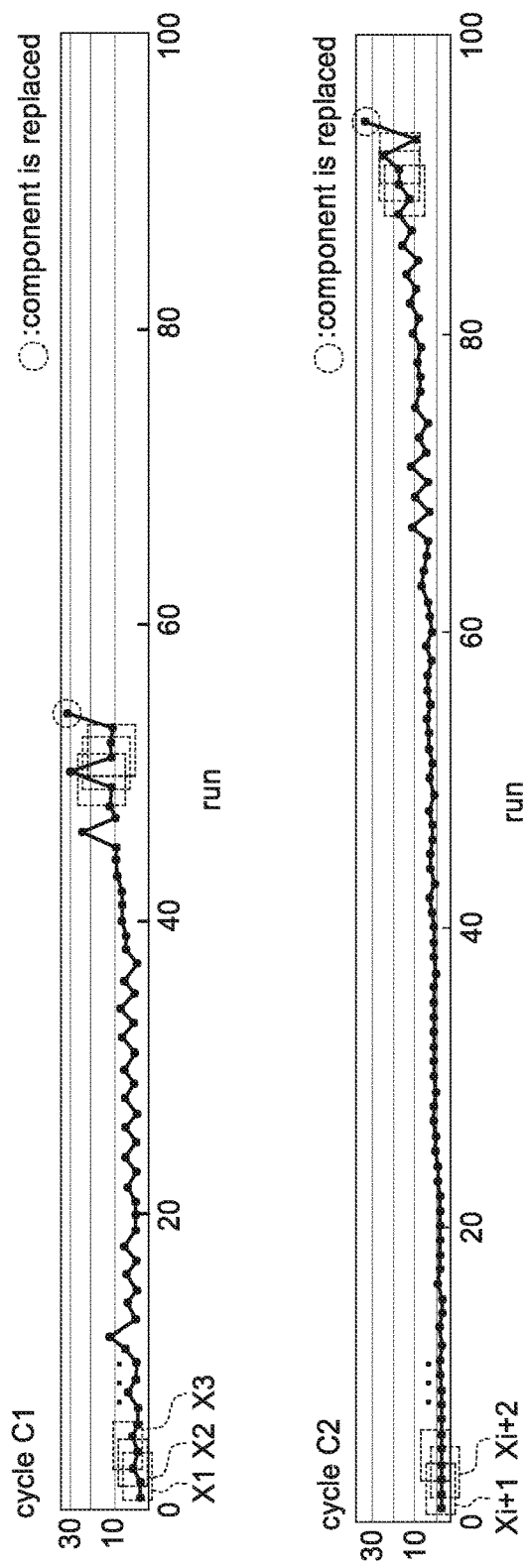
FIG. 4 shows a plurality of history sensing records in two cycles.

Firstly, in step S301, a plurality of history sensing records X1, X2, . . . , Xi+1, Xi+2, etc. are obtained from the database 110. Please refer to FIG. 4, which shows history sensing records X1, X2, X3, etc. in a cycle C1 and history sensing records Xi+1, Xi+2, etc. in a cycle C2. Every four runs are grouped and one history sensing record in this group is recorded. The history sensing records X1, X2, X3, . . . , Xi+1, Xi+2, etc. are mapped to a plurality of training RULs RUL1, RUL2, RUL3, . . . , RULi+1, RULi+2, etc. respectively. Each of the training RULs RUL1, RUL2, RUL3, . . . , RULi+1, RULi+2, etc. can be a remaining number of runs or a remaining life percentage. For example, if a particle filter is replaced at the 19th run in a cycle, the remaining number of runs is 14 and the remaining life percentage is 73.6% (=14/19) at the 5th run.

Figure 5:
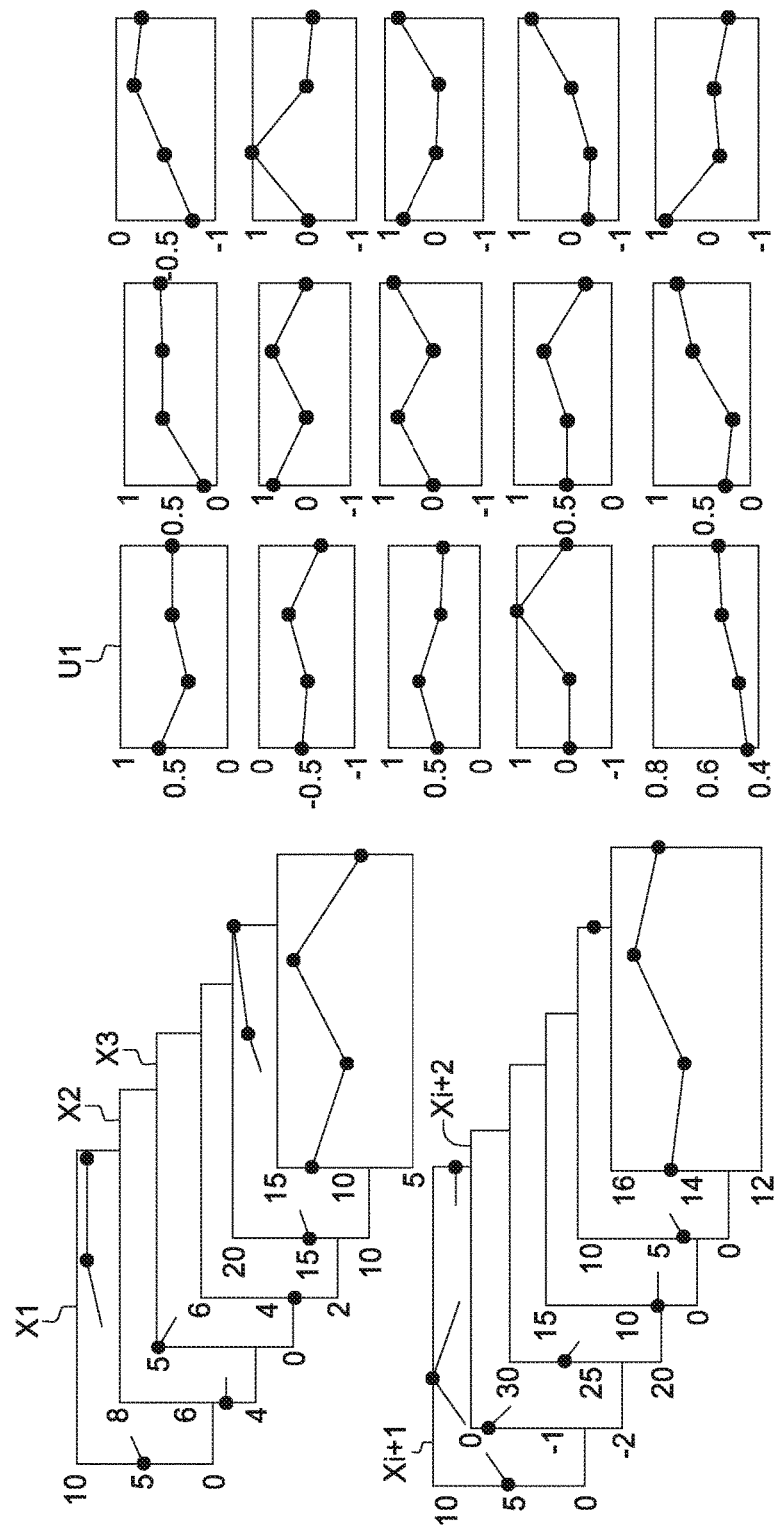
FIG. 5 shows at least one basis set.

Next, in step S302, by a dictionary learning algorithm, the dictionary training machine 141 of the feature capturing unit 140 generates at least one basis set U1 (or U2, etc.) according to the history sensing records X1, X2, X3, . . . , Xi+1, Xi+2, etc. For example, the dictionary learning algorithm can be a K-SVD algorithm or an online dictionary learning algorithm. Please refer to FIG. 5, which shows at least one basis set. Each basis set includes four runs. An approximation of any of the history sensing records X1, X2, X3, . . . , Xi+1, Xi+2, etc. can be obtained by linearly combining the at least one basis set.

Then, in step S303, the sparse coder 142 of the DAQ unit 140 generates a plurality of training features a1, a2, . . . , ai+1, ai+2, etc. according to the history sensing records X1, X2, X3, . . . , Xi+1, Xi+2, etc. by a sparse coding algorithm. The sparse coding algorithm can be a match pursuit algorithm, an orthogonal matching pursuit algorithm or a Lasso algorithm. Each of the history sensing records X1, X2, X3, . . . , Xi+1, Xi+2, etc. is a linear combination of one of the training features a1, a2, . . . , ai+1, ai+2, etc. and the basis sets U1, U2, etc. For example, the training feature a1 is a matrix [0, 0.5, 1, 0, 0, 1, . . . ], and the history sensing record X1 is a linear combination of the training feature a1 and the basis sets U1, U2, etc. The training feature a2 is a matrix [0, 0, 1.5, 0, 0, 1, . . . ], and the history sensing record X2 is a linear combination of the training feature a2 and the basis sets U1, U2, etc.

Afterwards, in step S304, the mapping function generating unit 120 obtains a mapping function according to the training features a1, a2, . . . , ai+1, ai+2, etc. The mapping function includes a relationship between the training features a1, a2, . . . , ai+1, ai+2, etc. and at least one predicting value. The at least one predicting value includes the training RULs RUL1, RUL2, RUL3, . . . , RULi+1, RULi+2, etc. and cycle identifications which represent as cycles C1, C2, etc. For example, the training feature a1 is mapped to a training RUL RULa1 and a cycle Ca1, the training feature a2 is mapped to a training RUL RULa2 and a cycle Ca2, and so on.

Next, in step S305, the DAQ unit 130 obtains a real time sensing record Xt.

Then, in step S306, the sparse coder 142 of the feature capturing unit 140 obtains an estimation feature AT according to the real time sensing record Xt.

Next, in step S307, the similarity analyzing unit 150 obtains k similar features atop1, atop2, . . . , atopk which are similar to the estimation feature AT according to the training features a1, a2, . . . , ai+1, ai+2, etc. by the similarity comparison algorithm. For example, the similarity comparison algorithm can be a k-nearest neighbor algorithm. Please refer to table 1, which shows the similarities between the estimation feature AT and the training features a1, a2, . . . , ai+1, ai+2, etc. respectively. After calculating the similarities between the estimation feature AT and the training features a1, a2, . . . , ai+1, ai+2, etc., the similarities are sorted to find the k similar features atop1, atop2, . . . , atopk.

TABLE 1

| Comparison | similarity |
|---|---|
| estimation feature AT and training feature a1 | 0.569 |
| estimation feature AT and training feature a2 | 0.301 |
| estimation feature AT and training feature a3 | 0.0301 |
| . . . | . . . |

Afterwards, in step S308, the RUL calculating unit 160 obtains the at least one predicting value via the mapping function according to the k similar features atop1, atop2, . . . , atopk. For example, k similar RULs RULatop1, RULatop2, . . . , RULatopk and k similar cycle Catop1, Catop2, . . . , Catopk mapping to the similar features atop1, atop2, atopk are obtained.

Then, in step S309, the RUL calculating unit 160 calculates an estimation RUL RULt according to the at least one predicting value, such as the similar RULs RULatop1, RULatop2, . . . , RULatopk. In this step, the RUL calculating unit 160 calculates the estimation RUL RULt by a weighted average calculation on the similar RULs RULatop1, RULatop2, . . . , RULatopk. In one embodiment, a weighting in the weighted average calculation is directly proportional or inversely proportional to the at least one predicting value. For example, the weighting factors of the similar RUL RULatop1, RULatop2, . . . , RULatopk are proportional to the repeat times of each of the similar cycles Catop1, Catop2, . . . , Catopk. For example, please refer to table 2, which shows three similar RULs RULatop1, RULatop2, RULatop3 and three similar cycles Catop1, Catop2, Catop3.

TABLE 2

| similar RUL | similar cycle |
|---|---|
| The value of the similar RUL RULatop1 is "18." | The similar cycle Catop1 is the 13th cycle. |
| The value of the similar RUL RULatop2 is "13." | The similar cycle Catop2 is the 13th cycle. |
| The value of the similar RUL RULatop3 is "17." | The similar cycle Catop3 is the first cycle. |

Both of the similar cycle Catop1 and the similar cycle Catop2 are the 13th cycle. The 13th cycle is repeated twice, so each of the weighting factors of the similar RULs RULatop1, RULatop2 should be twice as large as the weighting factor of the similar RUL RULatop3. The estimation RUL RULt can be calculated according to the following equation (1).

$$RULt = 2/5(-2/5(13) + 1/5(17) = 15.8 \quad (1)$$

Next, in step S310, the RUL calculating unit 160 further calculates an estimation confidence CF which is related to a variability of the at least one predicting value, such as a variability of the similar RULs RULatop1, RULatop2, ..., RULatopk. If the variability of the similar RULs RULatop1, RULatop2, ..., RULatopk is high, then the estimation confidence CF is low. Taken the table 2 as an example, the estimation confidence CF can be calculated according to the following equation (2).

$$CF = \frac{1}{\sqrt{\frac{1}{3}[(15.8-18)^2 + (15.8-13)^2 + (15.8-17)^2]}} = 0.212 \quad (2)$$

Then, in step S311, the RUL calculating unit 160 adjusts the estimation RUL RULt to be an estimation RUL RULt' according to the estimation confidence CF. For example, please refer to table 3, which shows the estimation RULs RULt at the previous time and the current time. Because the estimation confidence CF at the previous time is higher than the estimation confidence CF at the current time, the estimation RULt (=15.8) at the previous time is subtracted 1 to be the estimation RUL RULt' (=14.8).

TABLE 3

|  | previous time | current time | Adjust |
|---|---|---|---|
| estimation RUL RULt | 15.8 | 12.6 | 14.8 |
| estimation confidence CF | 0.212 | 0.198 | 0.212 |

Figure 6:
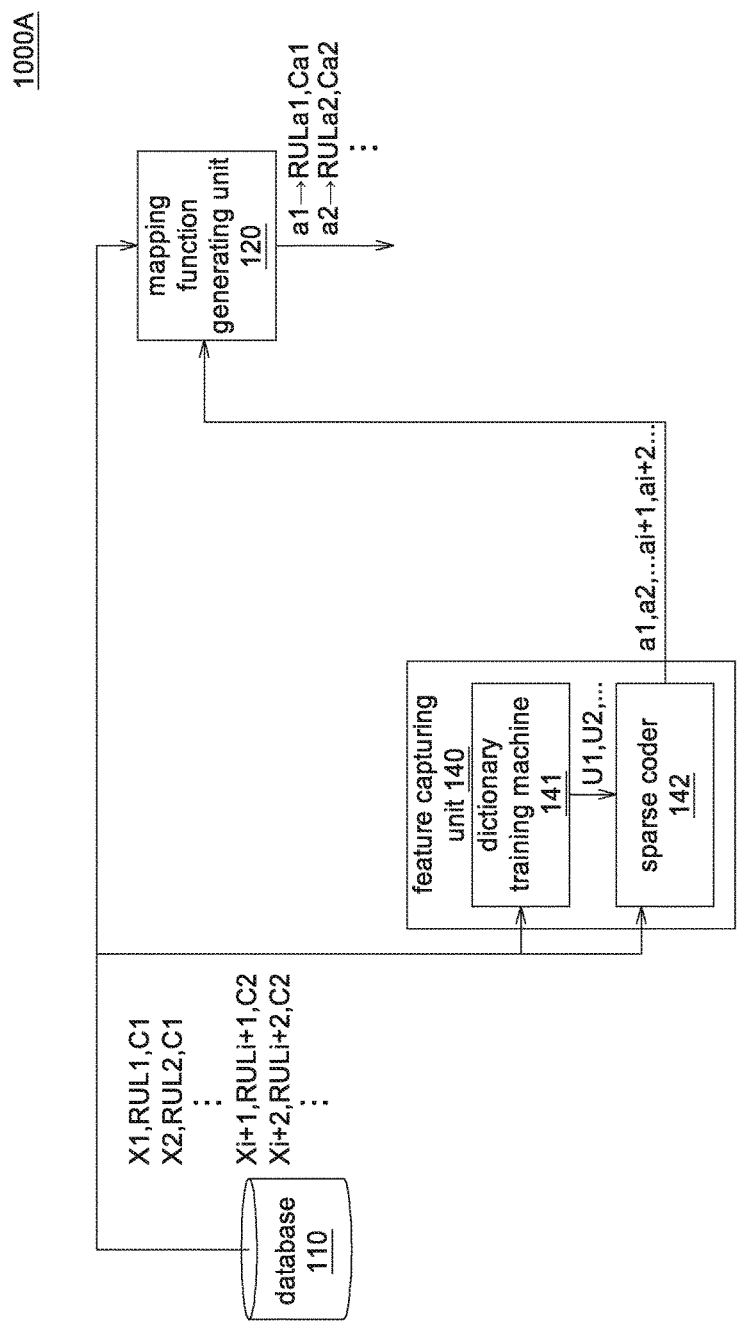
FIG. 6 shows an off-line system.
Figure 7:
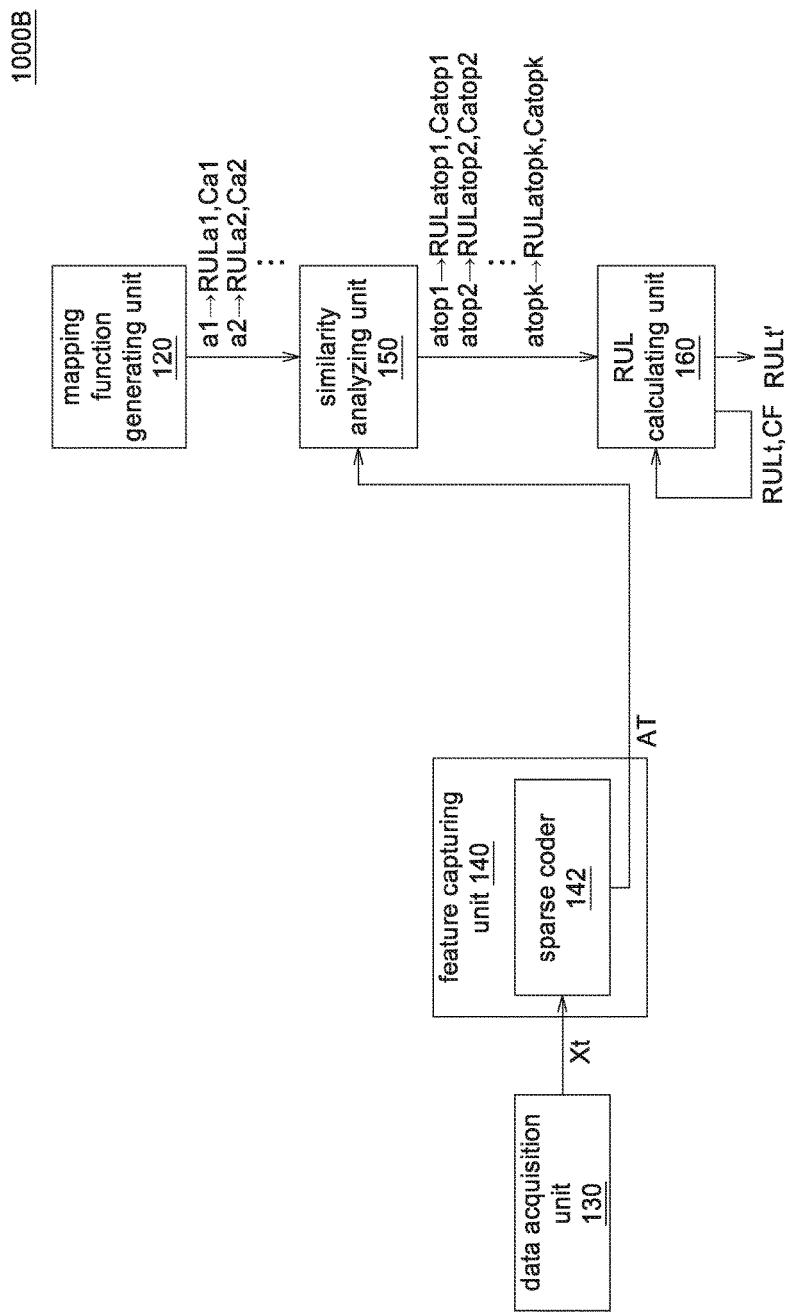
FIG. 7 shows an on-line system.

In one embodiment, the system 1000 can be divided into an off-line system 1000A and an on-line system 1000B. Please refer to FIG. 6 which shows the off-line system 1000A, and FIG. 7 which shows the on-line system 1000B. The off-line system 1000A used for performing the steps S301 to S304 includes the database 110, the mapping function generating unit 120 and the feature capturing unit 140. The on-line system 1000B used for performing the steps S305 to S311 includes the mapping function generating unit 120, the DAQ unit 130, the feature capturing unit 140, the similarity analyzing unit 150 and the RUL calculating unit 160.

According to the embodiments described above, the system 1000 and the off-line system 1000A can generate the basis sets U1, U2, etc. according to the history sensing records X1, X2, X3, ..., Xi+1, Xi+2, etc. Then, the training features a1, a2, ..., ai+1, ai+2, etc. are generated according to the history sensing records X1, X2, X3, ..., Xi+1, Xi+2, etc. Next, the mapping function is obtained according to the training features a1, a2, ..., ai+1, ai+2, etc. For example, the training feature a1 is mapped to the training RUL RULa1 and the cycle Ca1, the training feature a2 is mapped to the training RUL RULa2 and the cycle Ca2, and so on.

The system 1000 and the on-line system 1000B can obtain the estimation feature AT according to the real time sensing record Xt, and obtain the k similar features atop1, atop2, ..., atopk which are similar to the estimation feature AT. Next, the estimation RUL RULt is calculated by a weighted average calculation on the similar RULs RULatop1, RULatop2, ..., RULatopk, and the estimation confidence CF is calculated. Finally, the estimation RUL RULt is adjusted according to the estimation confidence CF.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for predicting a remaining useful life (RUL) of a component of an equipment, comprising:
  a data acquisition (DAQ) unit for obtaining a real time sensing record;
  a feature capturing unit for obtaining an estimation feature according to the real time sensing record, and obtaining a plurality of training features according to a plurality of history sensing records;
  a mapping function generating unit for obtaining a mapping function according to the training features, wherein the mapping function includes a relationship between the training features and at least one predicting value;
  a similarity analyzing unit for obtaining k similar features which are similar to the estimation feature according to the training features; and
  a RUL calculating unit for obtaining the at least one predicting value via the mapping function according to the k similar features and calculating an estimation RUL according to the at least one predicting value;
  wherein the equipment is a semiconductor equipment.

2. The system according to claim 1, wherein the feature capturing unit further comprises:
  a dictionary training machine for generating at least one basis set according to the history sensing records; and
  a sparse coder for generating the training features according to the history sensing records by linearly combining the at least one basis set, and generating the estimation feature according to the real time sensing record by linearly combining the at least one basis set.

3. The system according to claim 1, wherein the at least one predicting value includes a remaining number of runs.

4. The system according to claim 1, wherein the at least one predicting value includes a remaining life percentage.

5. The system according to claim 1, wherein the at least one predicting value includes a cycle identification which represents one operation cycle.

6. The system according to claim 1, wherein the RUL calculating unit calculates the estimation RUL by a weighted average calculation on the at least one predicting value.

7. The system according to claim 6, wherein a weighting in the weighted average calculation is inversely proportional to the at least one predicting value.

8. The system according to claim 6, wherein a weighting in the weighted average calculation is directly proportional to the at least one predicting value.

9. The system according to claim 1, wherein the RUL calculating unit further calculates an estimation confidence which is related to a variability of the at least one predicting value.

10. The system according to claim 9, wherein the RUL calculating unit adjusts the estimation RUL according to the estimation confidence.

11. A method for predicting a remaining useful life (RUL) of a component of an equipment, comprising:
  obtaining a real time sensing record;
  obtaining an estimation feature according to the real time sensing record, and obtaining a plurality of training features according to a plurality of history sensing records;

obtaining a mapping function according to the training features, wherein the mapping function includes a relationship between the training features and at least one predicting value;

obtaining k similar features which are similar to the estimation feature according to the training features; and obtaining the at least one predicting value via the mapping function according to the k similar features and calculating an estimation RUL according to the at least one predicting value.

12. The method according to claim 11, wherein the equipment is a semiconductor equipment.

13. The method according to claim 11, further comprising:

generating at least one basis set according to the history sensing records; and generating the training features according to the history sensing records by linearly combining the at least one basis set, and generating the estimation feature according to the real time sensing record by linearly combining the at least one basis set.

14. The method according to claim 11, wherein the at least one predicting value includes a remaining number of runs.

15. The method according to claim 14, wherein a weighting in the weighted average calculation is inversely proportional to the at least one predicting value.

16. The method according to claim 14, wherein a weight in the weighted average calculation is directly proportional to the at least one predicting value.

17. The method according to claim 16, further comprising:

adjusting the estimation RUL according to the estimation confidence.

18. The method according to claim 11, wherein the at least one predicting value includes a remaining life percentage.

19. The method according to claim 11, wherein the at least one predicting value includes a cycle identification which represents one operation cycle.

20. The method according to claim 11, wherein in the step of calculating the estimation RUL, the estimation RUL is calculated by performing a weighted average calculation on the at least one predicting value.

21. The method according to claim 11, further comprising:

calculating an estimation confidence which is related to a variability of the at least one predicting value.

* * * * *